United States Patent
Padiak et al.

(10) Patent No.: US 6,775,936 B2
(45) Date of Patent: Aug. 17, 2004

(54) MOVABLE DISPLAY SIGN

(75) Inventors: Scott Padiak, Winnetka, IL (US); Thomas M. Conway, Park Ridge, IL (US); Christopher Dominic, Westchester, IL (US); Paul Charle Evans, Chicago, IL (US)

(73) Assignee: Cormark, Inc., Des Plaines, IL (US)

( * ) Notice: Subject to any disclaimer, the term of this patent is extended or adjusted under 35 U.S.C. 154(b) by 15 days.

(21) Appl. No.: 10/280,190

(22) Filed: Oct. 25, 2002

(65) Prior Publication Data

US 2003/0230016 A1 Dec. 18, 2003

Related U.S. Application Data

(60) Provisional application No. 60/388,585, filed on Jun. 13, 2002.

(51) Int. Cl.[7] .................................................. G09F 7/00
(52) U.S. Cl. ............................................... 40/601
(58) Field of Search .................. 40/606.11, 601, 40/606.14, 611.07, 611.11, 520, 508, 316, 356, 375, 512, 509, 513, 491

(56) References Cited

U.S. PATENT DOCUMENTS

| | | | |
|---|---|---|---|
| 685,630 A | * 10/1901 | Nichols | 40/491 |
| 1,337,315 A | * 4/1920 | Harvey | 40/491 |
| 1,830,510 A | * 11/1931 | Julius et al. | 40/491 |
| 3,226,173 A | * 12/1965 | Giovanni | 312/306 |
| 3,878,879 A | 4/1975 | Manns | |
| 4,557,309 A | 12/1985 | Judkins | |
| 4,762,159 A | 8/1988 | Ford | |
| 4,770,224 A | 9/1988 | Dubbelman | |
| 4,829,688 A | * 5/1989 | Mouraret et al. | 40/622 |
| 5,082,043 A | 1/1992 | Moreno | |
| 5,533,559 A | 7/1996 | Judkins | |
| 5,823,610 A | 10/1998 | Ryan et al. | |
| 5,923,313 A | * 7/1999 | Black et al. | 345/108 |
| 5,941,001 A | * 8/1999 | Dietrich et al. | 40/603 |
| 6,055,754 A | * 5/2000 | Melhuus | 40/601 |
| 6,082,433 A | 7/2000 | Vafaie et al. | |
| 6,168,291 B1 | 1/2001 | Rockey et al. | |
| 6,591,528 B2 | * 7/2003 | Ellingsen | 40/601 |
| 6,634,610 B1 | * 10/2003 | Ricci et al. | 248/330.1 |
| 2003/0089461 A1 | 5/2003 | Dondlinger | |
| 2004/0006904 A1 | * 1/2004 | Hildenbrand | 40/606.01 |

FOREIGN PATENT DOCUMENTS

| | | |
|---|---|---|
| EP | 314967 A2 | 5/1989 |
| EP | 1013870 A2 | 6/2000 |
| SU | 483339 A | 12/1975 |

\* cited by examiner

*Primary Examiner*—Mark T. Le
(74) *Attorney, Agent, or Firm*—Welsh & Katz, Ltd.

(57) ABSTRACT

A display sign can be moved easily for access behind where the display sign had been, and easily restored to its original position, without having to unattach and reattach the sign.

25 Claims, 6 Drawing Sheets

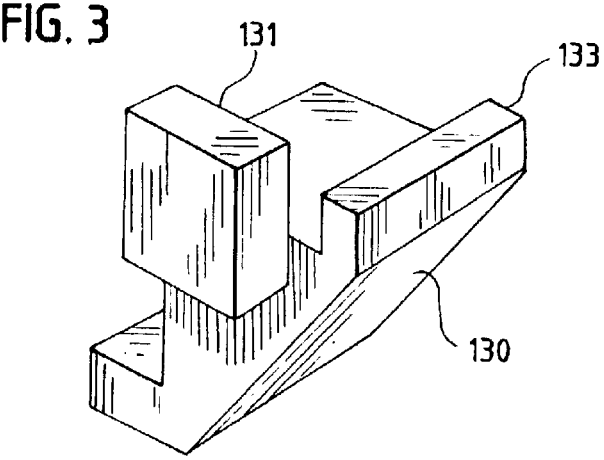
FIG. 3
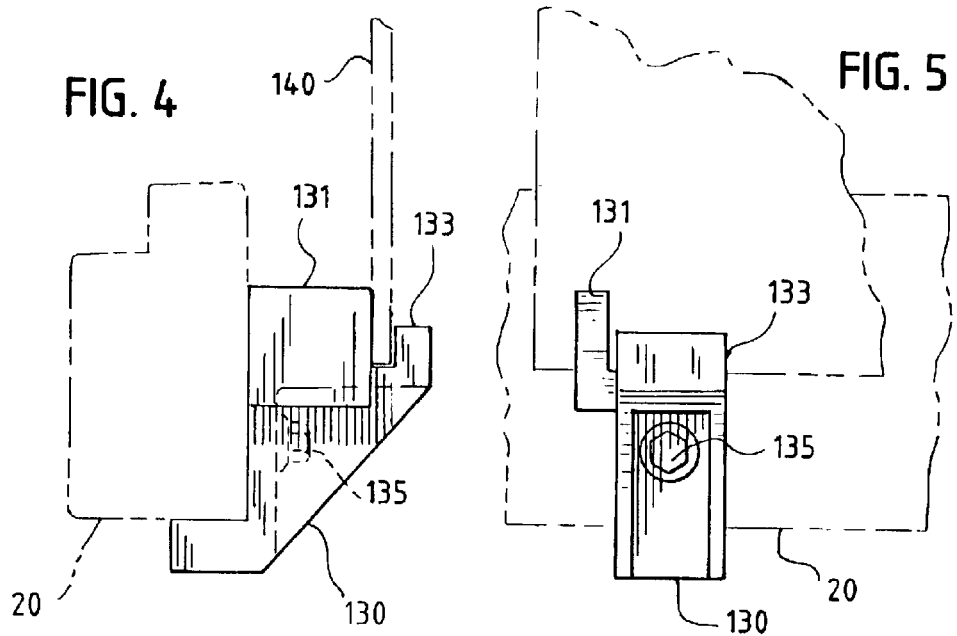
FIG. 4
FIG. 5
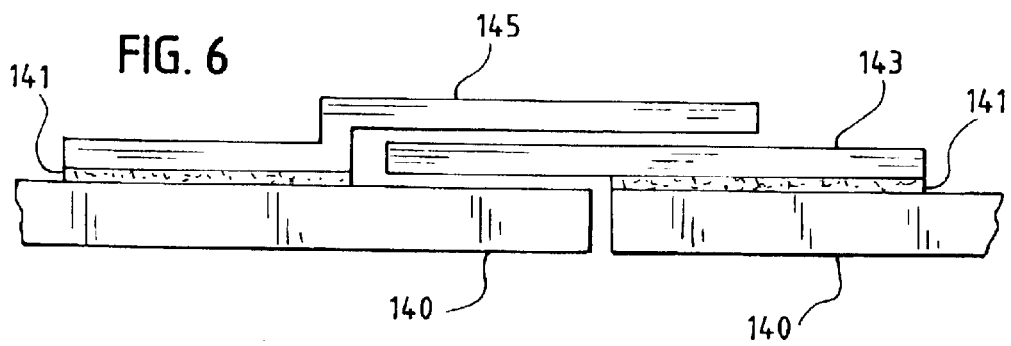
FIG. 6

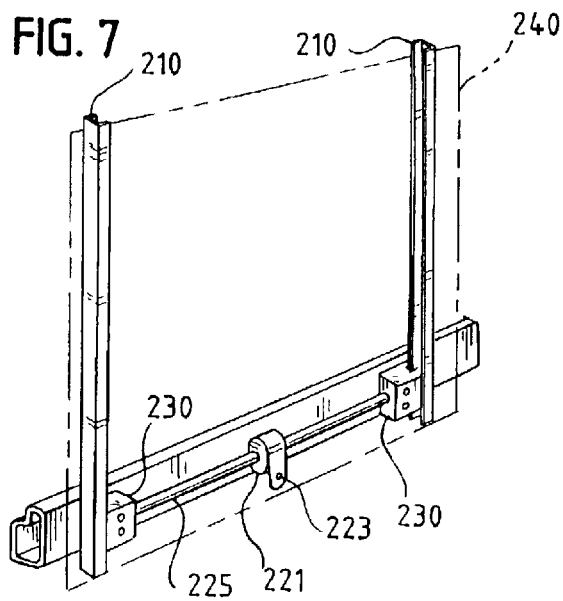
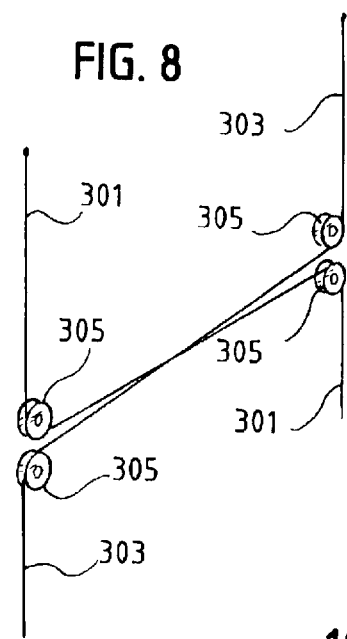
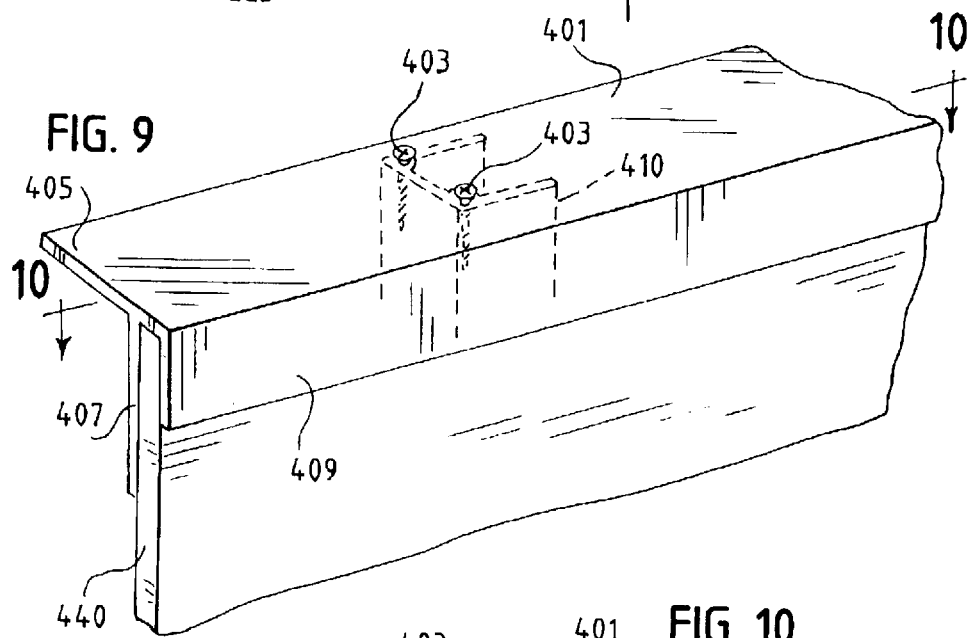
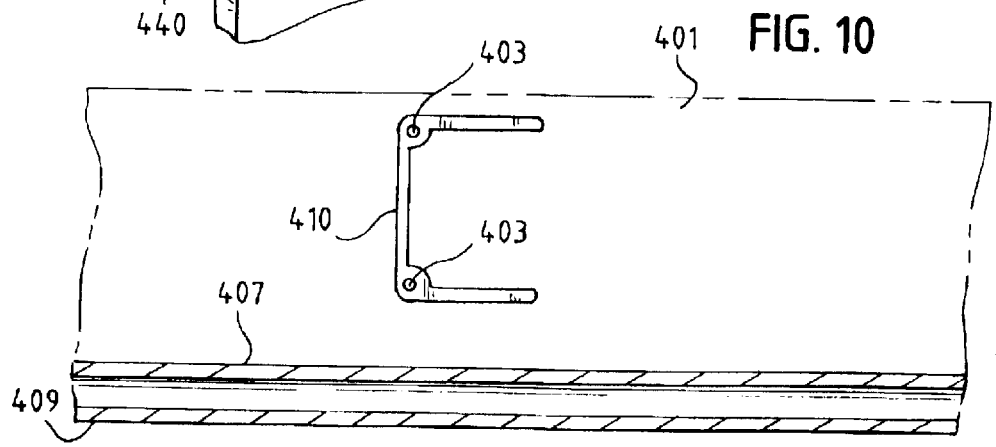

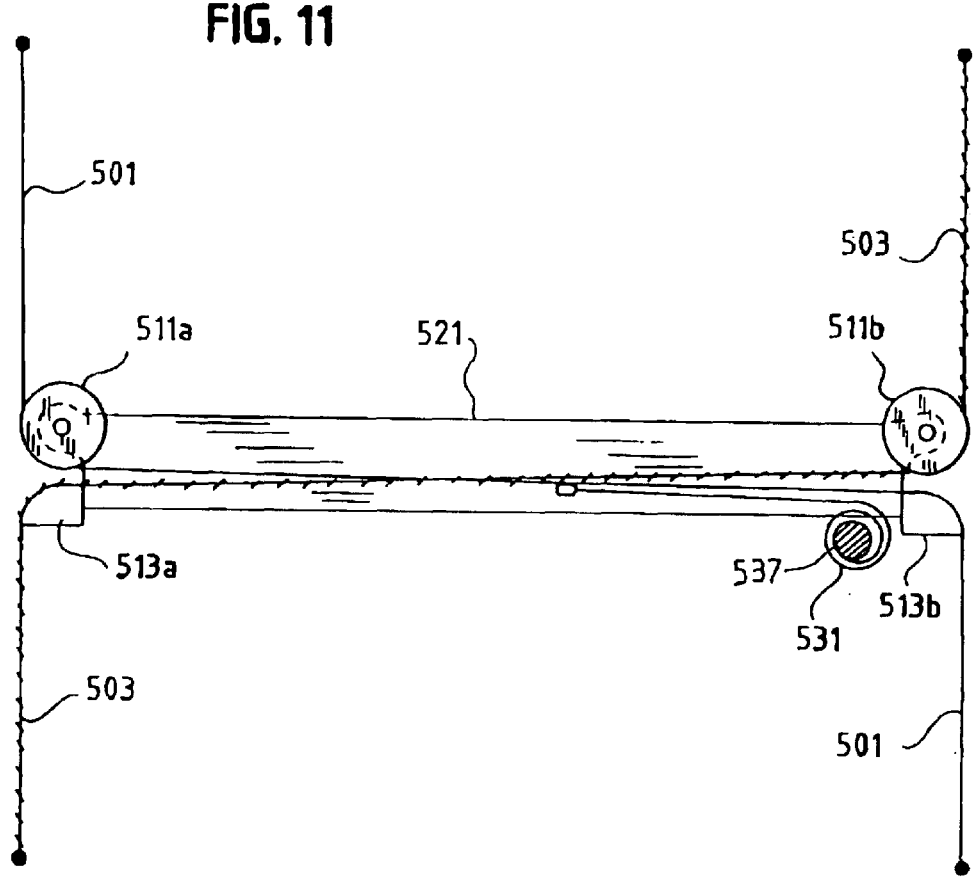
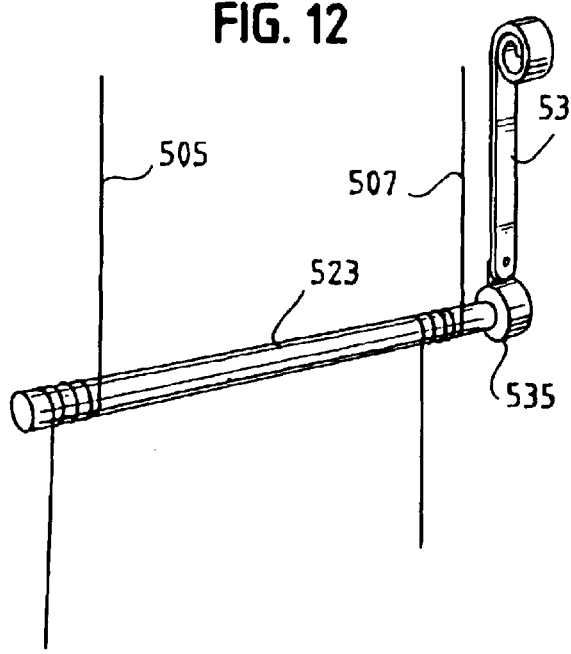
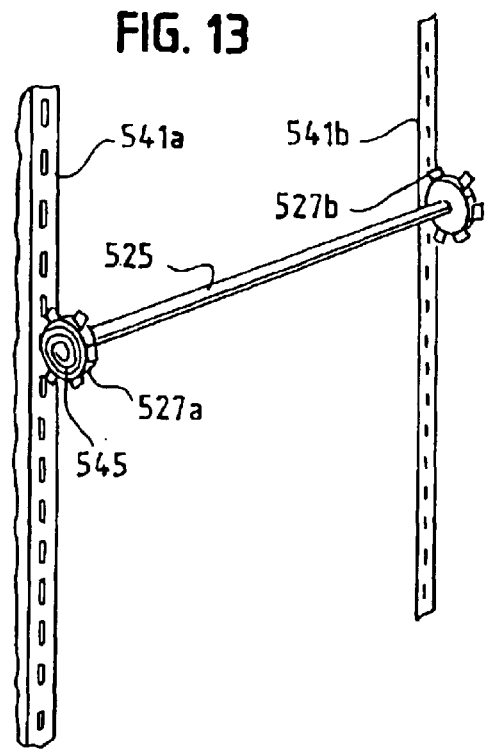

MOVABLE DISPLAY SIGN

This application claims the benefit of the filing date of provisional application Ser. No. 60/388,585 which was filed on Jun. 13, 2002.

This invention pertains to a movable display sign assembly. For example, the sign can be used in front of shelves such as in warehouse type stores. In some embodiments, this sign does not require unattaching the sign for access to the shelf behind the sign, or re-attaching the sign after access to the shelf.

BRIEF DESCRIPTION OF THE DRAWINGS

The components in the figures are not necessarily to scale.

FIG. 3 is an enlarged perspective view of a side bracket of FIG. 1.

FIG. 4 is a side view of the side bracket of FIG. 3, shown in one simulated environment.

FIG. 5 is a front view of the side bracket of FIG. 3, shown in one simulated environment.

FIG. 6 is a partial top view illustrating a panel alignment feature of the invention.

FIG. 7 is a perspective view of another embodiment of the invention shown in one simulated environment. A graphic panel located in front of other components is shown in phantom.

FIG. 8 is a sketch illustrating operation of another embodiment of the invention.

FIG. 9 is a partial perspective view illustrating a locking feature of the invention, and showing a vertical support of FIG. 7 in phantom.

FIG. 10 is a horizontal section taken along 10—10 of FIG. 9.

FIG. 11 is a sketch illustrating operation of another embodiment of the invention.

FIG. 12 is a sketch illustrating operation of another embodiment of the invention.

FIG. 13 is a sketch illustrating operation of another embodiment of the invention.

FIG. 17b is a sketch of a cut-away top view of the embodiment of FIG. 17a.

DETAILED DESCRIPTION OF SOME EMBODIMENTS

Figure 1:
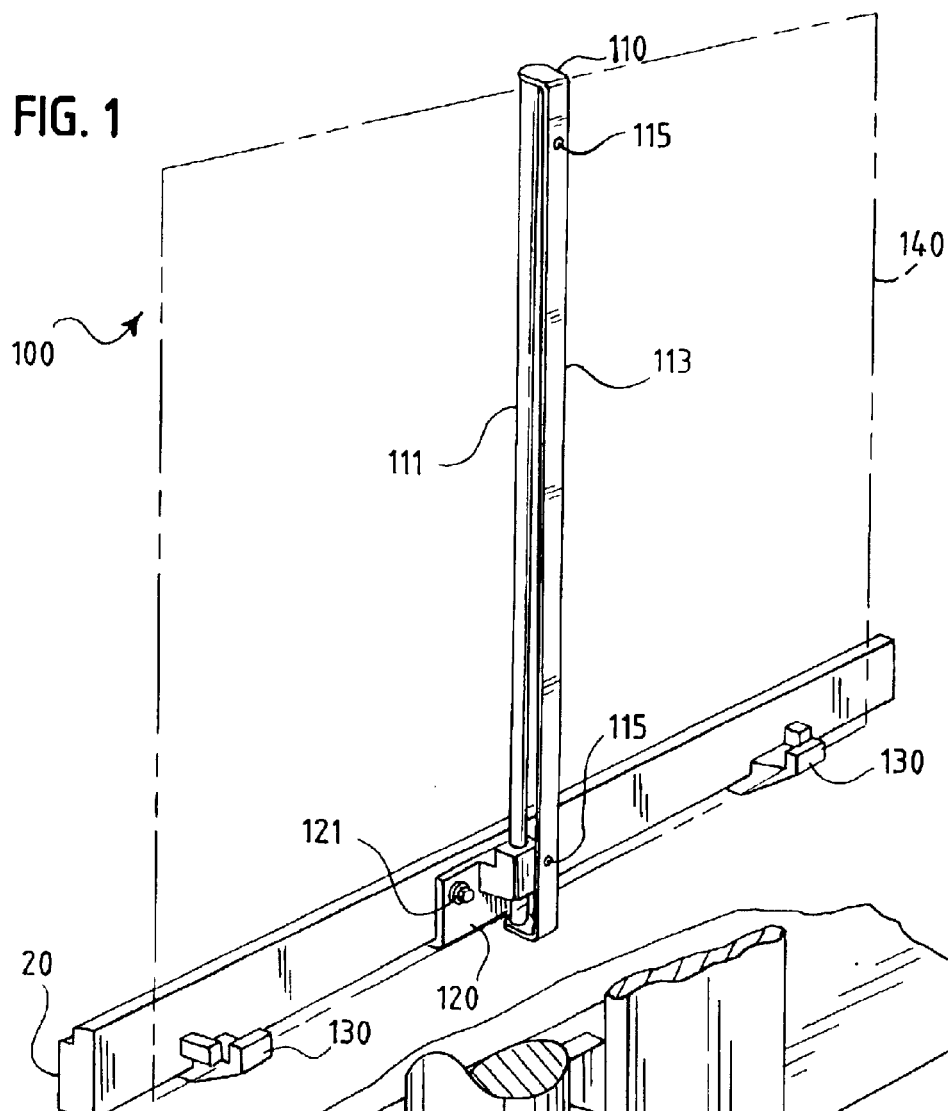
FIG. 1 is a perspective view of one embodiment of the invention shown in one simulated environment. A graphic panel located in front of other components is shown in phantom.

While the present invention is susceptible of embodiment in various forms, there is shown in the drawings and will hereinafter be described some embodiments with the understanding that the present disclosure is to be considered an exemplification of the invention and is not intended to limit the invention to the specific embodiments illustrated.

One embodiment of a movable display sign assembly 100 is shown in FIG. 1. The assembly 100 is shown attached to a pallet-rack beam 20. A display or other information could be presented on a graphic panel 140. As one possible example, panel 140 can be commercially available ⅛" double-tempered hardboard. A panel 140 with 4'×4' dimensions, for example, would be suitable for many warehouse type store applications. Without unattaching it, the panel 140 can be moved to allow access to shelving behind the panel 140 such as, for example, shelving not shown which may be supported at least in part by beam 20.

In some embodiments of the invention, adjacent graphic panels 140 can be aligned as illustrated in FIG. 6. Flat tongue 143 and Z-tongue 145 can keep adjacent panels 140 relatively well aligned in the same vertical plane, such as to maintain a more attractive appearance along the shelving. Tongues 143 and 145 can be an extruded plastic, for example, and can be secured to panels 140 by foam tape 141, for example. In one embodiment, tongues 143 and 145 can extend vertically for the entire height of the panels 140. In one embodiment, flat tongue 143 can overlap the panel 140, to which it is not attached, by about an inch, and Z-tongue 145 can overlap the panel 140, to which it is not attached, by about a half inch.

In the embodiment of FIG. 1, panel 140 is mechanically secured to sliding spine 110, such as with fasteners 115 for example. In the embodiment of FIG. 1, spine 110 includes a flat front portion 113 to which panel 140 is secured, and a cylindrical rear portion 111 which slides through center bracket 120. Center bracket 120 is secured to beam 20, such as with fastener 121 for example. In other embodiments, other components which support panel 140 while it is sliding up and down can be substituted for sliding spine 110. In the embodiment of FIG. 1, panel 140 is supported by two side brackets 130 when it is in one rest position. In other embodiments, there could be a different number of side brackets 130. Side brackets 130 are secured to beam 20.

Figure 2:
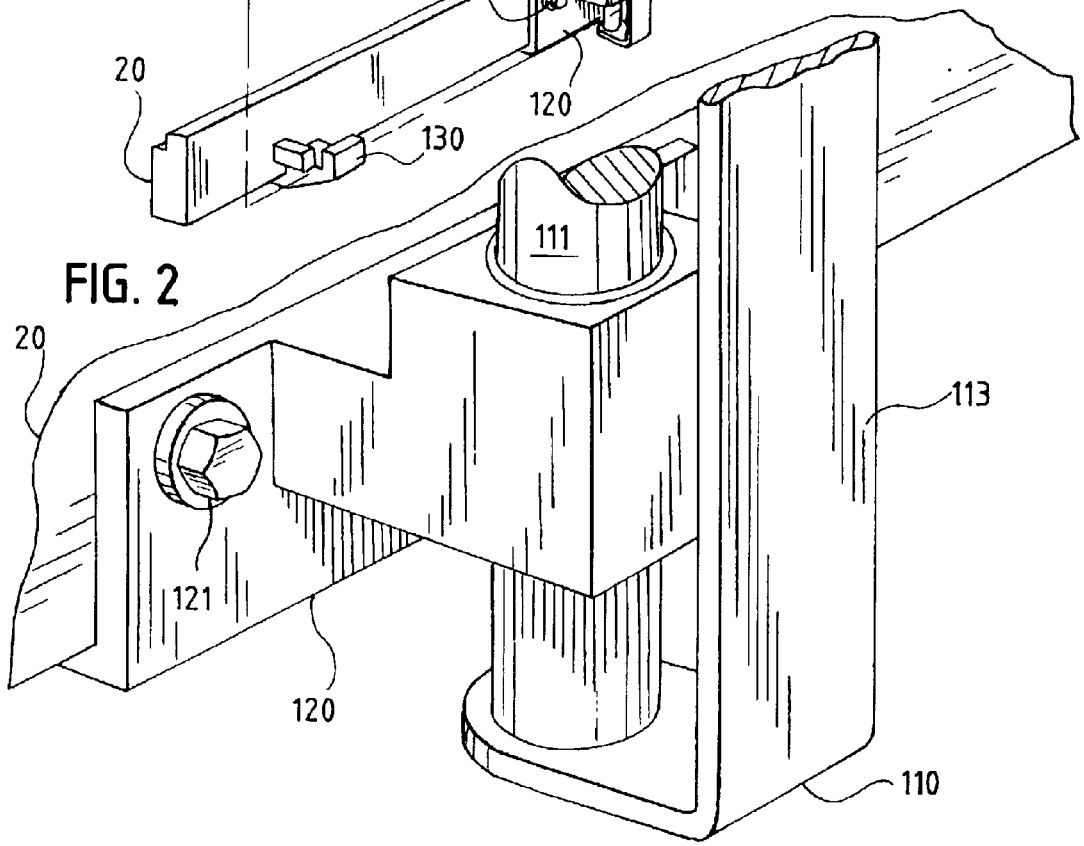
FIG. 2 is an enlarged perspective view of a center bracket and part of a sliding spine of FIG. 1, shown in one simulated environment.

Center bracket 130 and part of sliding spine 110 are seen better in FIG. 2. They can be made of various materials and formed in various ways as are known in the art. For example, center bracket 120 can be injection molded plastic. The cylindrical rear portion 111 of spine 110 can be a steel tube, for example, welded to the flat front portion 113 which can be any compatible flat stock. However, other materials, other methods of formation, and other configurations can be used. In FIG. 2, only one fastener 121 is visible securing center bracket 120 to beam 20. However, there can be others such as to the right of spine 110 and on the bottom of beam 20.

Side bracket 130 is seen better in FIGS. 3, 4 and 5. It can be made of various materials and formed in various ways as are known in the art. For example, side bracket 130 can be an injection molded plastic, possibly polyethelene. As best seen in FIG. 4, graphic panel 140 can be supported by side brackets 130 when it is one rest position. Panel 140 easily can be lifted up out of side brackets 130, and pushed up or allowed to slide down in front of front stops 133. In the example of FIGS. 3 and 5, back stop 131 is seen on the left side of side bracket 130. However, if a side bracket 130 has a back stop 131, the back stop 131 can be on the left side, the right side, both sides, in between, or any combination of positions. In the example of FIGS. 4 and 5, side bracket 130 is secured to beam 20 by fastener 135.

Another embodiment of the invention is illustrated in FIG. 7. In the embodiment of FIG. 7, graphic panel 240 is secured to vertical supports 210, which slide up and down through vertical grooves in mounting blocks 230, which are secured to pallet-rack beam 20. Supports 210 can be of a variety of constructions such as extruded aluminum, rolled steel, or bent steel, as examples. Mounting blocks 230 can be of a variety of constructions such as injection molded plastic, as an example.

In the embodiment of FIG. 7, bar 225 is supported by mounting blocks 230. Bar 225 can be of a variety of materials such as steel or aluminum, for example. A spring 221 which is secured to bar 225 and to panel 240 can be extended when panel 240 is pushed down, and can automatically restore panel 240 to its original position. For example, spring 221 can be a constant force spring, with a coil of the spring mounted around bar 225 so that it can unwind around its axis and extend its length parallel to panel 240 as panel 240 is lowered. The end of spring 221 can be secured to panel 240 by a fastener 223, for example. As another example, the end of spring 221 can be bent into a J and fitted to the bottom of panel 240. When extended, spring 221 presents a constant restoring force to pull panel 240 back up when it is no longer being held down. As an example, spring 221 can be a tight coil of flat steel spring stock.

A locking feature is illustrated in FIGS. 9 and 10. A lateral extrusion 401 can have a horizontal portion 405 and two vertical portions 407 and 409. Vertical portions 407 and 409 can form a narrow channel between them into which graphic panel 440 can be fitted. In an embodiment such as the one illustrated in FIG. 7, for example, the horizontal portion 405 can be secured to supports 410 such as with fasteners 403 for example. Panel 440 can be locked in a lowered position by, for example, moving horizontal portion 405 under a lip (not shown) of mounting blocks 230 in an embodiment such as the one illustrated in FIG. 7. Lateral extrusion 401 can be of a variety of constructions such as injection molded plastic, as an example.

Operation of another embodiment of the invention is illustrated in FIG. 8. Two cables 301 and 303 are arranged to maintain the vertical alignment of a graphic panel (not shown) as it is raised or lowered. Each of the cables is fixed at their end points. In FIG. 8, the top of cable 301 is fixed on the left and the bottom of cable 301 is fixed on the right, and just the opposite is true for cable 303. They cross each other as they are routed past guides 305. The graphic panel would be raised or lowered in cooperation with guides 305. As the panel is raised, more of cable 301 would be on the bottom right and less on the top left, and just the opposite is true for cable 303.

In the embodiment of FIG. 11, bar 521 facilitates the even raising and lowering of a graphic panel (not shown) which would be coupled to bar 521. The bar 521 comprises a hollow tube in the embodiment of FIG. 11. This allows cables 501 and 503 to be located at least in part within the bar 521. However, cables 501 and 503 could, for example, extend along the outside of a bar which was not a hollow tube.

As seen in FIG. 11, the bar 521 can include pullies 511a and 511b and fixed guides 513a and 513b near the ends of bar 521, to help guide cables 501 and 503. The pullies 511a and 511b and fixed guides 513a and 513b need not be present in other embodiments or can be present in different combinations. For example, there could be just one pully at each end of bar 521 without a guide for the other cable at that end, there could be just one fixed guide at each end of bar 521 without a pulley for the other cable at that end, there could be two fixed guides at each end of bar 521, and there could be two pullies at each end of bar 521, etc.

In the embodiment demonstrated in FIG. 11, spring 531 is attached to bar 521, with an outer end of the spring fixed to one of the cables (cable 501 in the example of FIG. 11). For example, spring 531 can be a constant force spring, with a coil of the spring mounted on bar 521 so that it can turn freely on its axis and so that it can extend its length parallel to bar 521. For example, spring 531 can be a tight coil of flat steel spring stock wound around a shaft.

As bar 521 is moved down, cables 501 and 503 move through bar 521. As a result, more of each of cables 501 and 503 extends above bar 521, and correspondingly less of each of cables 501 and 503 remains below bar 521. As this occurs, the coil of spring 531 unwinds as the end of spring 531 (which is attached to cable 501) is pulled through bar 521. Spring 531 presents a constant restoring force to pull cable 501 back through bar 521, raising bar 521 and a graphic panel coupled to bar 521 when bar 521 is no longer being held down. This arrangement keeps the bar generally horizontal as it is lowered or raised.

While FIG. 11 shows a single spring 531 attached to one of the two cables 501 and 503, there could be more than one spring in other embodiments, and springs could be attached to both cables in other embodiments. Furthermore, there are many types of springs known in the art, and spring 531 is not limited to springs described above.

Figure 14:
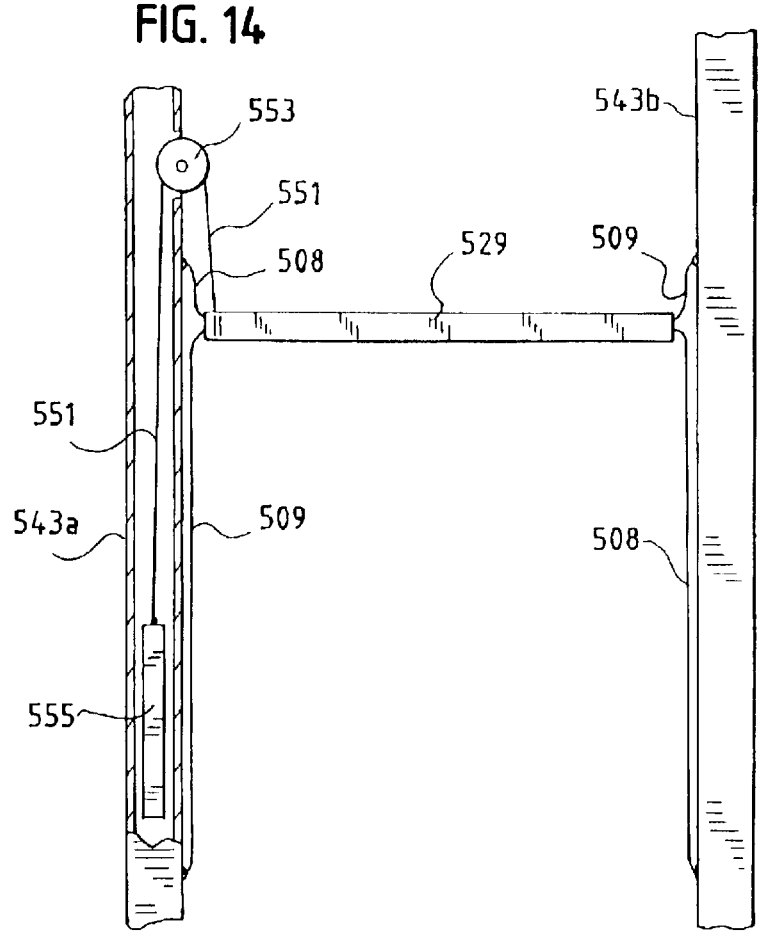
FIG. 14 is a sketch illustrating operation of another embodiment of the invention in one simulated environment.

In addition, the restoring-force mechanism need not be a spring in other embodiments. For example, the restoring-force mechanism could be one or more counterweights. The operation of one example is illustrated in FIG. 14. In the FIG. 14 embodiment, a bar 529 is suspended between two upright beams 543a and 543b. A graphic panel (not shown) could be coupled to bar 529.

In the embodiment of FIG. 14, cables 508 and 509 keep the bar 529 generally horizontal. One end of cable 508 is attached to upright beam 543a. Cable 508 extends through bar 529 and then down along upright beam 543b. The other end of cable 508 is attached to upright beam 543b. Similarly, one end of cable 509 is attached to upright beam 543b. Cable 509 extends through bar 529 and then down along upright beam 543a. The other end of cable 509 is attached to upright beam 543a.

The restoring force in the embodiment of FIG. 14 is supplied by a counterweight 555, which is connected to bar 529 by a cable 551 which rotates over a pulley 553. In the embodiment of FIG. 14, counterweight 555 is shown traveling inside of upright beam 543a.

In other embodiments, counterweight 555 could travel elsewhere, such as adjacent to upright beam 543a as one example. In different embodiments, there could be more than one counterweight, possibly in different locations. As other examples, there could be a combination of restoring-force mechanisms such as a spring and a counterweight. As another example, a counterweight could be weighted to balance the panel rather than to automatically restore it to an original position.

Furthermore, while cable 551 is shown rotating over a pulley 553 in FIG. 14, other embodiments need not have a pulley, or can have a substitute component. For example, there could be a fixed guide, or even a more complicated block and tackle.

FIG. 12 illustrates operation of an another alternative embodiment. A graphic panel (not shown) could be coupled to a rotating carrier such as bar 523. For example, a graphic panel could be coupled to rings (not shown) within which bar 523 can be allowed to rotate freely. However, instead of controlling the bar with cables extending through or along the bar, cables 505 and 507 wrap around their respective ends of bar 523. Cable 505 can extend both above and below bar 523 at only one end of bar 523. Similarly, cable 507 can extend both above and below bar 523 at the other end of bar 523. The ends of the cables 505 and 507 can be attached to fixed components (not shown) such as upright beams. In other embodiments, there could be a different number of cables, and/or one or both ends of bar 523 could ride in a track(s), possibly with locking mechanisms to maintain the bar 523 at desired positions.

In the embodiment of FIG. 12, spring 533 is used for restoring bar 523 (and a coupled graphic panel not shown) to its original position after the bar 523 is moved down. Spring 533 is a constant force spring similar to spring 531 in FIG. 11. In FIG. 12, an outer end of spring 533 is coupled to bar 523 via a ring 535, and the coil of spring 533 is mounted on a fixed component (not shown) such as an upright beam. Bar 523 is allowed to rotate freely within ring 535 without rotating the end of spring 533.

While the embodiment of FIG. 12 shows a a single flat coil constant force spring, there can be other restoring-force mechanisms, such as a counterweight for example, or a combination of such restoring-force mechanisms in other embodiments. There can be a different number of springs and/or different types of springs known in the art in other embodiments.

For example, there could be a torsion spring (not shown) inside of bar 523. Due to the relationship between bar 523 and cables 505 and 507, bar 523 rotates as it is lowered or raised. One end of the torsion spring could be fixed to bar 523, and could rotate with bar 523 as bar 523 is lowered. The second end of the torsion spring could be fixed to a shuttle (not shown) traveling in a track on an upright beam (not shown). The second end of the torsion spring would move down with bar 523, but would not rotate with bar 523. The restoring force of the torsion spring could move the bar 523 and its coupled graphic panel back up to the original position.

FIG. 13 illustrates operation of another alternative embodiment. A graphic panel (not shown) could be coupled to a carrier such as bar 525. However, instead of controlling the bar with cables, gears 527a and 527b at respective ends of bar 525 could ride up and down vertical racks 541a and 541b, respectively. Various retaining devices known in the art could be used to keep the bar 525 in the vertical plane of the racks 541a and 541b. For example, gears 527a and 527b could be trapped in a C-channel (not shown) in racks 541a and 541b, respectively. As other examples, a blocking bar such as a vertical pole could block bar 525 from leaving the vertical plane of the racks 541a and 541b, or the interconnecting relationship between the gear teeth and the racks 541a and 541b could serve that function.

A torsion spring 545 could supply the force to maintain the bar 525 at an initial position or restore it to that position after it is moved down. One end of the torsion spring 545 could be fixed to the bar 525. If the bar 525 does not rotate with gears 527a and 527b, then a second end of torsion spring 545 could be fixed to gear 527a, for example. In another embodiment, one end of the torsion spring 545 could be fixed to gear 527a, for example, or to bar 525 if bar 525 rotates with gear 527a as bar 525 moves down. The second end of the torsion spring 545 could be fixed to a shuttle (not shown) traveling in a track along rack 541a for example. The second end of the torsion spring 545 would move down with bar 525, but would not rotate with bar 525. In that case, for example, a graphic panel could be coupled to rings (not shown) within which bar 525 can be allowed to rotate freely. In other embodiments, there can be a different number of springs, different types of springs, counterweights, and/or other restoring-force mechanisms known in the art.

In any of the embodiments, there can be a manual locking feature, as is known in the art, to keep the graphic panel down. For example, the graphic panel could be pulled down to allow access to a shelf. The locking feature, such as a bolt or other protrusion in cooperation with a receptacle for example, could be engaged to keep the panel down while the shelf is being accessed. The locking feature then could be disengaged and the panel could automatically return to its original position.

Figure 15:
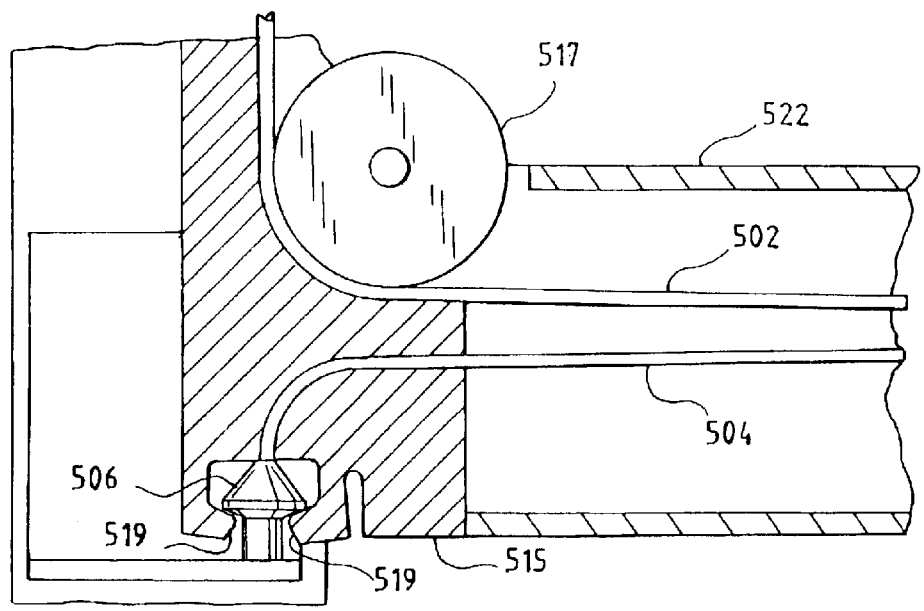
FIG. 15 is a sketch illustrating operation of one embodiment of an automatic locking feature, in the locked position.

FIG. 15 illustrates one embodiment of an automatic locking feature. In the embodiment of FIG. 15, the movable display sign assembly can operate in a manner similar to the operation illustrated in FIG. 11. In FIG. 15, parts of cables 502 and 504 are located within bar 522. Pully 517 helps guide cable 502 near one end of bar 522, and fixed guide 515 helps guide cable 504 near that same end of bar 522.

In the embodiment of FIG. 15, the automatic locking feature is provided by a hook and protrusion combination. The end of bar 522 comprises a flexible hook 519. A protrusion 506 on cable 504 is located so that it will get trapped behind flexible hook 519 when bar 522 has been lowered to an appropriate stopping position. The hook and protrusion combination will provide sufficient resistance to the restoring force to keep the bar 522 down. However, when the bar 522 is pushed up enough to move protrusion 506 past flexible hook 519, the bar 522 will automatically return to its original position. In other embodiments, the hook and protrusion combination could be used in connection with a different cable and/or at a different location.

Figure 16:
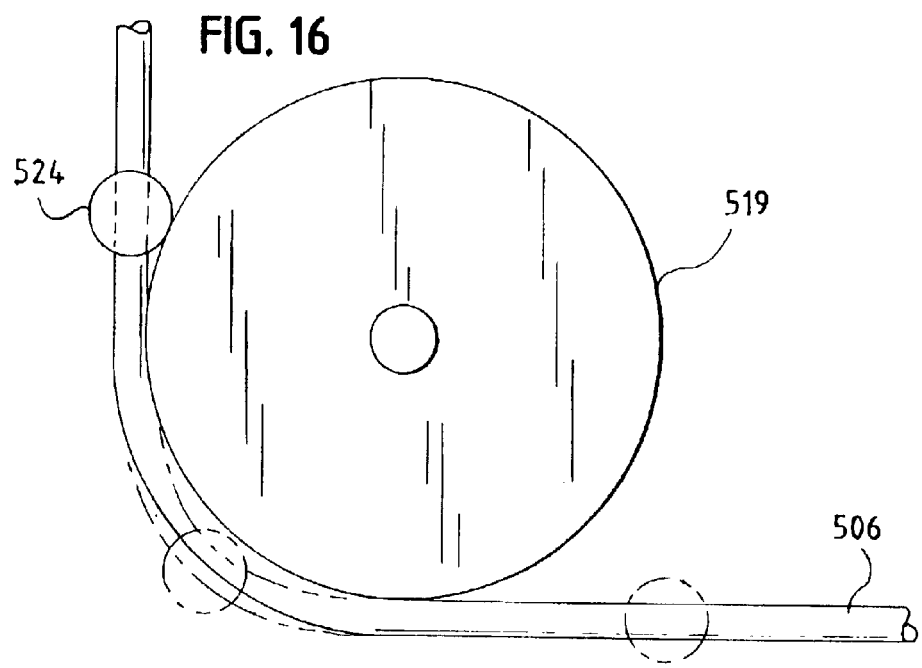
FIG. 16 is a sketch illustrating operation of another embodiment of an automatic locking feature.

FIG. 16 illustrates another embodiment of an automatic locking feature. In the embodiment of FIG. 16, the movable display sign assembly can operate in a manner similar to the operation illustrated in FIG. 11. In FIG. 16, cable 506 rotates around pulley 519 as a graphic panel moves up or down. Protrusion 524 on cable 506 is shown on one side of pulley 519. Protrusion 524 is shown in phantom rotating around pulley 519, and on the other side of pulley 519.

Protrusion 524 is located on cable 506 so that it will get trapped on one side of pulley 519 when the graphic panel has been lowered to an appropriate stopping position. Protrusion 524 will provide sufficient resistance to the restoring force to keep cable 506 from rotating around pulley 519, and consequently to keep the graphic panel from moving back up to its original position. However, when the graphic panel is pushed up enough to move protrusion 524 around pulley 519, the graphic panel will automatically return to its original position. In different embodiments, the protrusion could be used with different cables and/or in connection with different pulleys.

Figure 17A:
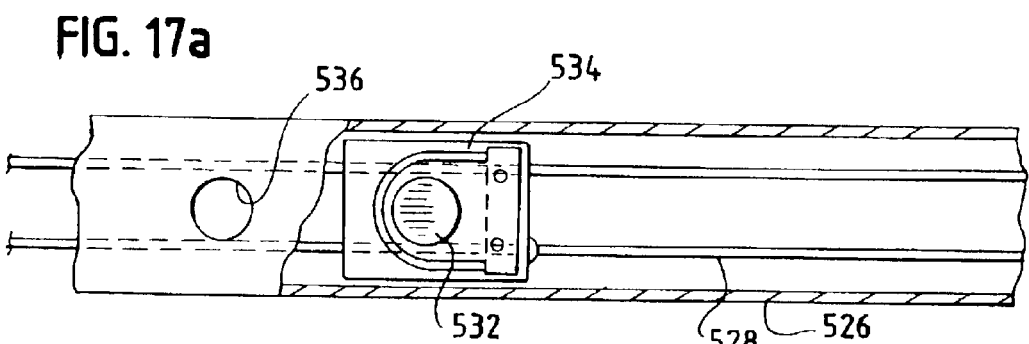
FIG. 17a is a sketch of a partial cut-away front view illustrating operation of another embodiment of an automatic locking feature, in the unlocked position.
Figure 17B:
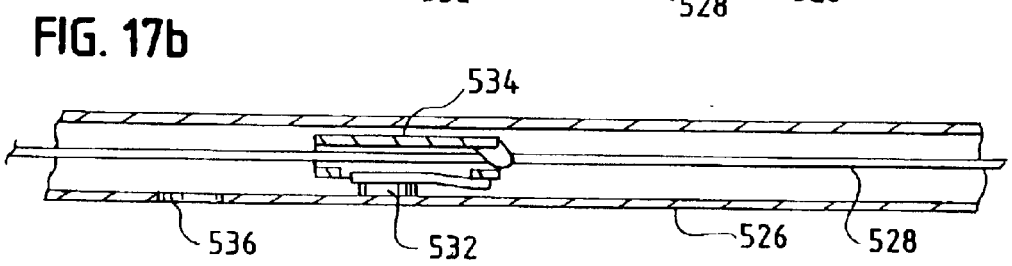
Figure 17C:
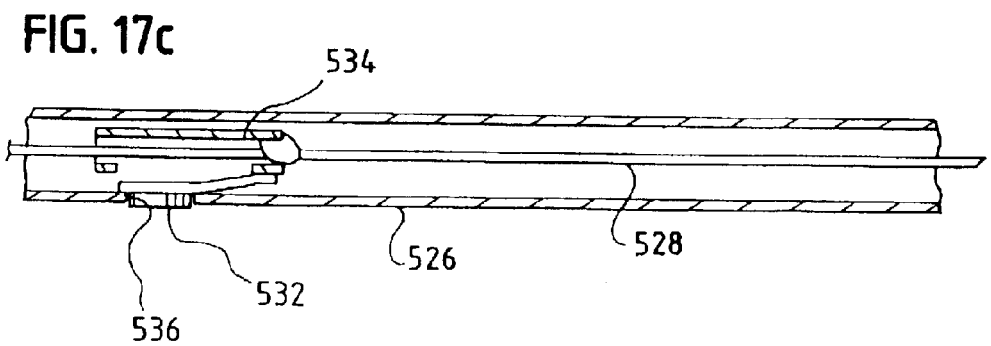
FIG. 17c is sketch of a cut-away top view of the embodiment of FIG. 17a, but in the locked position.

FIGS. 17a through 17c illustrate another embodiment of an automatic locking feature. Similar to the operation illustrated in FIG. 11, in FIGS. 17a through 17c the movable display sign assembly comprises a hollow bar 526 with a cable 528 extending through the inside of bar 526. A shuttle 534 is attached to cable 528, and carries a locking tab 532 which is biased to press against an interior surface of bar 526. Opening 536 is positioned in the front surface of bar 526 so that locking tab 532 will push into opening 536, when cable 528 has moved through bar 526 far enough for the graphic panel to be at an appropriate stopping position.

The locking tab 532 being trapped in opening 536 will provide sufficient resistance to the restoring force to keep cable 528 from moving back through the bar 526. Pressing in the locking tab 532 allows the restoring force to pull the cable 528 back through the bar 526, and the graphic panel will automatically return to its original position. In different embodiments, the locking tab and opening combination could be used in connection with a different cable and/or at a different location.

In one embodiment, a shuttle (such as shuttle 534 of FIGS. 17a through 17c) can be attached to a cable together with the end of a spring (such as spring 531 of FIG. 11).

From the foregoing it will be observed that numerous modifications and variations can be effectuated without departing from the true spirit and scope of the novel concepts of the present invention. It is to be understood that no limitation with respect to the specific embodiments illustrated is intended or should be inferred.

What is claimed is:

1. A movable display sign assembly for use in connection with shelving structure, the movable display sign assembly comprising:
    a panel suitable for displaying a graphic presentation;
    a first cable;
    a second cable;
    cable guides;
    a top end of the first cable fixedly mountable to a first side of the shelving structure;
    a bottom end of the first cable fixedly mountable to a second side of the shelving structure;
    a top end of the second cable fixedly mountable to the second side of the shelving structure;
    a bottom end of the second cable fixedly mountable to the first side of the shelving structure;
    the cable guides capable of directing the first cable to cross between the first and second sides of the shelving structure;
    the cable guides capable of directing the second cable to cross between the first and second sides of the shelving structure;
    the panel coupled to the cable guides; and
    wherein, without disconnection from the shelving structure, the panel and the coupled cable guides can be moved in a vertical direction from an original position to allow access to shelving behind the panel, and can be moved in an opposite vertical direction to restore the panel to the original position.

2. The movable display sign assembly as in claim 1,
    the cable guides comprising first guides;
    the cable guides further comprising second guides;
    the cable guides further comprising a bar;
    the panel coupled to the bar;
    the first guides coupled to a first end of the bar;
    the second guides coupled to a second end of the bar; and
    the cable guides capable of directing each of the first and second cables along the bar between the first guides and the second guides.

3. The movable display sign assembly as in claim 1,
    the cable guides comprising a bar;
    the bar surrounding a hollow interior; and
    the cable guides capable of directing the first and second cables through the hollow interior of the bar.

4. The movable display sign assembly as in claim 1,
    the cable guides comprising two first guides;
    the cable guides further comprising two second guides; and
    each of the two first guides and each of the two second guides selected from a group consisting of: a fixed guide and a pulley.

5. The movable display sign assembly as in claim 1, further comprising a restoring force mechanism capable of automatically restoring the panel to the original position after the panel has been moved from the original position.

6. The movable display sign assembly as in claim 5, the restoring force mechanism comprising at least one spring.

7. The movable display sign assembly as in claim 6,
    a first end of the spring coupled to the cable guides; and
    a second end of the spring capable of being coupled to one of the first and second cables.

8. The movable display sign assembly as in claim 6, the at least one spring comprising a constant force spring.

9. The movable display sign assembly as in claim 8, the restoring force mechanism further comprising a shaft; and
    the constant force spring comprising a tight coil of flat steel spring stock wound around the shaft.

10. The movable display sign assembly as in claim 5, the cable guides comprising a bar;
    the bar surrounding a hollow interior;
    the cable guides capable of directing the first and second cables through the hollow interior of the bar;
    the restoring force mechanism comprising a shaft;
    the shaft coupled to the bar;
    the shaft allowed to turn freely about its axis;
    the restoring force mechanism further comprising a constant force spring;
    the spring forming a coil around the shaft;
    a first end of the spring coupled to the shaft;
    a second end of the spring capable of being coupled to one of the first and second cables; and
    wherein the spring can unwind and extend along the one of the first and second cables when the panel is moved from the original position, and can automatically rewind to restore the panel to the original position.

11. The movable display sign assembly as in claim 10, wherein the spring can unwind and extend along the one of the first and second cables within the hollow interior of the bar.

12. The movable display sign assembly as in claim 5, the restoring force mechanism comprising at least one counterweight.

13. The movable display sign assembly as in claim 12, the at least one counterweight surroundable at least in part by a vertical beam of the shelving structure.

14. The movable display sign assembly as in claim 12,
    the restoring force mechanism further comprising a counterweight cable;
    the restoring force mechanism further comprising a cable redirection mechanism;
    a first end of the counterweight cable coupled to the counterweight; and
    a second end of the counterweight cable coupled to the cable guides.

15. The movable display sign assembly as in claim 14, the cable redirection mechanism selected from a group consisting of: a fixed guide, a pulley, and a block and tackle.

16. The movable display sign assembly as in claim 1, further comprising a locking mechanism capable of retaining the panel in a second position.

17. The movable display sign assembly as in claim 16, the locking mechanism comprising:
   one of a protrusion and a receptacle;
   the one of the protrusion and the receptacle coupled to the cable guides;
   the one of the protrusion and the receptacle capable of cooperating with another of the protrusion and the receptacle, the other fixed to the shelving structure;
   the one of the protrusion and the receptacle positioned to cooperate with the other when the panel is in the second position.

18. The movable display sign assembly as in claim 16, the locking mechanism comprising:
   two vertical portions;
   a horizontal portion;
   the two vertical portions forming a channel between them;
   an edge of the panel inserted into the channel;
   the horizontal portion capable of cooperating with a lip fixed to the shelving structure;
   the horizontal portion positioned to cooperate with the lip when the panel is in the second position.

19. The movable display sign assembly as in claim 1, further comprising:
   a locking mechanism capable of automatically retaining the panel in a second position; and
   a restoring force mechanism capable of automatically restoring the panel to the original position after release of the locking mechanism.

20. The movable display sign assembly as in claim 19,
   an end of the cable guides comprising a flexible hook;
   the locking mechanism comprising a protrusion;
   the protrusion coupled to one of the first and second cables; and
   the protrusion positioned to cooperate with the flexible hook when the panel is in the second position.

21. The movable display sign assembly as in claim 19,
   the cable guides comprising a pulley;
   the locking mechanism comprising a protrusion;
   the protrusion coupled to one of the first and second cables; and
   the protrusion positioned to cooperate with the pulley when the panel is in the second position.

22. The movable display sign assembly as in claim 19,
   the cable guides comprising a bar;
   the bar surrounding a hollow interior;
   the cable guides capable of directing one of the first and second cables through the hollow interior of the bar;
   the locking mechanism comprising a shuttle;
   the shuttle capable of being coupled to the one of the first and second cables;
   the shuttle comprising a locking tab;
   the locking tab biased to press against an interior surface of the bar;
   the bar defining an opening through the interior surface; and
   the opening positioned to cooperate with the locking tab when the panel is in the second position.

23. The movable display sign assembly as in claim 22,
   the restoring force mechanism comprising a spring; and
   one end of the spring coupled to the shuttle.

24. The movable display sign assembly as in claim 1, further comprising:
   a tongue;
   a Z-tongue;
   the tongue secured to the panel along a first vertical edge of the panel;
   the tongue extending beyond the first vertical edge;
   the Z-tongue secured to the panel along a second vertical edge of the panel;
   the Z-tongue extending beyond the second vertical edge;
   each of the tongue and the Z-tongue positioned to cooperate with a mating Z-tongue and tongue, respectively, of adjacent panels, to maintain the panel in generally a same vertical plane as the adjacent panels.

25. The movable display sign assembly as in claim 1, further comprising at least one counterweight capable of balancing the panel.

* * * * *